United States Patent [19]
Schuster et al.

[11] Patent Number: 5,880,042
[45] Date of Patent: Mar. 9, 1999

[54] CLOTHING FOR PROTECTION AGAINST STAB AND BULLET WOUNDS

[75] Inventors: Dieter Hans Peter Schuster, Sassenburg; Achim G. Fels; Guido Schurmann, both of Wuppertal, all of Germany

[73] Assignee: Akzo Nobel NV, Arnhem, Netherlands

[21] Appl. No.: 776,051

[22] PCT Filed: Jul. 19, 1995

[86] PCT No.: PCT/EP95/02849

§ 371 Date: Jan. 17, 1997

§ 102(e) Date: Jan. 17, 1997

[87] PCT Pub. No.: WO96/03277

PCT Pub. Date: Feb. 8, 1996

[30] Foreign Application Priority Data

Jul. 28, 1994 [DE] Germany .......... 44 26 748.7

[51] Int. Cl.⁶ .................................... B32B 7/00
[52] U.S. Cl. ............................................ 442/59
[58] Field of Search ................ 442/59; 428/246

[56] References Cited

U.S. PATENT DOCUMENTS

| | | |
|---|---|---|
| 4,357,387 | 11/1982 | George et al. . |
| 4,713,284 | 12/1987 | Hasegawa et al. . |
| 4,997,704 | 3/1991 | Jarrabet . |
| 5,073,441 | 12/1991 | Melec et al. . |
| 5,200,263 | 4/1993 | Gould et al. . |
| 5,514,457 | 5/1996 | Fels et al. . |

FOREIGN PATENT DOCUMENTS

| | | |
|---|---|---|
| 2927653-A1 | 1/1981 | Germany . |
| 3426458-A1 | 1/1986 | Germany . |
| 3743243-A1 | 6/1989 | Germany . |
| 9012342.5 | 12/1990 | Germany . |
| 3938741-A1 | 3/1991 | Germany . |
| 3937087-A1 | 5/1991 | Germany . |
| 4114809-A1 | 11/1992 | Germany . |
| 1397955 | 6/1975 | United Kingdom . |
| 2221976 | 2/1990 | United Kingdom . |
| WO 92/02153 | 2/1992 | WIPO . |
| WO 92/08608 | 5/1992 | WIPO . |

*Primary Examiner*—Johann Richter
*Assistant Examiner*—Joseph Murray
*Attorney, Agent, or Firm*—Oliff & Berridge, PLC

[57] ABSTRACT

Protective clothing, in particular clothing which protects against injuries caused by stabbing instruments, cutting instruments, projectiles or splinters, consisting of multiple layers of flat structures. At least one side of at least one of these layers has been given a ceramic coating applied by plasma spraying. The layers preferably consist of woven fabrics made from aramide fibers. The protective clothing is especially suitable for stab protection, but a combined protection against the threat of stabbing or projectile weapons can also be achieved by this clothing while providing a good standard of wearer comfort.

18 Claims, No Drawings

CLOTHING FOR PROTECTION AGAINST STAB AND BULLET WOUNDS

BACKGROUND OF THE INVENTION

The invention relates to protective clothing, in particular to clothing which protects against injuries caused by stabbing instruments, cutting instruments, projectiles or splinters, and which consists of multiple layers of flat structures.

Several types of clothing protecting against the effects of stabbing and cutting instruments as well as against projectiles and splinters are described in the prior art. Usually this type of clothing consists of multiple layers, the individual layers often being made from the same material. The use of different materials for the individual layers is however also well-known.

Very often aramide-fibre woven fabrics are used in the individual protective layers, especially for so-called antiballistic protective clothing (clothing which provides protection against projectiles and splinters). one example of this is DE-A 3 426 458, in which a laminate made from such fabrics is described for use in projectile-inhibiting clothing.

Beside this, woven fabrics and other textile flat structures made from high-tenacity polyethylene fibers have been suggested for use in antiballistic protective clothing.

The use of aramide fibers for protection against cuts has also been described. In EP-A 224 425 a special knit construction of aramide fibers combined with a resin finish is discussed for this type of application.

In EP-A 519 359 flat structures consisting of wrapped yarn containing aramide fibers as the core and natural or chemical fibers in the sheath which can easily be dyed or printed, are suggested for the manufacture of stab-, cut-, splinter- and bullet-proof clothing.

In GB-A 2 221 976 an antiballistic helmet is described whose shell is fabricated out of a textile material embedded in a plastic matrix and coated with a thick ceramic layer applied by means of plasma spraying. This document classified as belonging to the area of hard ballistics does not offer any clues to solving the problem of gaining a combination of protection against projectiles and stabbing in soft ballistic protective clothing.

GB-A 1 397 955 discloses a ceramic layer applied using plasma spraying. The material coated is embedded in a plastic matrix. This fiber-plastic composite, which is also classified as belonging to hard ballistics, possesses an antiballistic effect. This document again offers no clue as to how to solve the problem of combining protection against projectiles and against stabbing in soft ballistic protective clothing.

The improvement of clothing providing humans with protection against injury is an on-going task for those concerned with developing this type of clothing. Beside improvements to the effectiveness of the protection provided, a worthwhile goal is above all to improve the comfort of the wearer. Also constantly in demand are approaches mapping out a simpler and cheaper method of manufacturing this type of clothing.

An especially important demand is for antiballistic clothing, i.e., clothing which is to provide protection against projectiles and splinters, to be designed in such a way that this clothing also protects against the effects of stabbing. This demand is voiced in particular by police personnel, who are exposed not only to shots from projectile weapons but also to stabbing attacks.

Clothing affording combined bullet- and stab-protection is already well-known in the art. In EP-A 597 165 a panel formed out of superimposed woven fabrics of high-strength fibers embedded in a matrix resin is suggested for this application. The panel is employed in protective vests in combination with layers of traditional antiballistic woven-fabric layers, chiefly for protecting the breast and back regions.

With this type of protective clothing, as with the already proposed use of metal panels as inserts into protective vests, it cannot be guaranteed that the wearer will have the freedom of movement necessary in a duty situation. Beside their relatively heavy weight, the fact that the vest inserts lack flexibility makes them a great deal less comfortable to wear.

Thus the task of improving this kind of protective clothing still remained to be done, especially as to wearer comfort.

SUMMARY OF THE INVENTION

A surprising discovery has been made, namely that it is possible to achieve a decided improvement in the effectiveness of protection without making the garment less comfortable to wear, if single layers of the protective clothing are fabricated out of flat structures which have been coated with a layer of ceramic material using plasma spraying. The preferred flat structures suitable for use as carrier materials for this coating consist of aramides, preferably woven fabrics of aramide fibers.

DETAILED DESCRIPTION OF PREFERRED EMBODIMENTS

The plasma spray coating of woven fabrics, including aramide-fibre woven fabrics, is well-known in electrical technology applications. Such methods and applications are described in U.S. Pat. Nos. 4,357,387, 4,713,284 and DE-U 90 12 342.

Nowhere in these patent publications is mention made of the fact that flat structures with a plasma-sprayed ceramic coating display very good stab-protection properties and can therefore be applied to protective clothing with advantage. For this reason it was surprising that such materials can be employed to great advantage for stab-protective clothing and especially for clothing which provides both stab- and bullet-protection.

A large number of different materials can be employed as carrier material for plasma-sprayed ceramic coatings. If they are to be suitable for use in protective clothing, the materials must be available in the form of flat structures. These can be sheets, films, woven fabrics, knitted articles, nonwoven fabrics or thread composites. The flat structures consisting of fibers, such as woven, knitted or nonwoven fabrics or thread composites, are all subsumed under the collective term "textile flat structures". In the scope of this invention, woven fabrics are preferred as carrier material for the ceramic coating in the manufacture of protective clothing.

So long as textile flat structures are employed and given a ceramic coating with a plasma spray, various fibre materials can be used in their manufacture. The preferred types of fibre are those which already possess the necessary properties for stab and antiballistic protection without further treatment. Aramide or glass fibers are two such examples. But equally, aliphatic polyamide fibers, polyester fibers or carbon fibers can be used as carrier materials, in the form of textile flat structures, for the ceramic coating. Out of the materials named, it is the aramides which are preferred. Aramide-fibre woven fabrics are especially preferred.

Aramides, especially aramide fibers, are well-known in the industry. They have a number of applications in the industrial textile industry in particular. Aramides are also known as "aromatic polyamides". One trade name given to an aramide fibre is Twaron@, for example. The term aramides is understood to mean polymers which are obtained by the polycondensation of an aromatic acid or its chlorides with an aromatic diamine. A well-known example is poly-p-phenyleneterephthalamide, formed from terephthalic acid and 1,4-phenylenediamine. In the scope of this invention, however, polymers which are not entirely composed of aromatic compounds but also contain aliphatic, alicyclic or heterocyclic compounds are also referred to as aramides. In the scope of the invention, antiballistic materials are understood to mean those materials which provide resistance to entry by projectiles or splinters and which significantly reduce the speed of projectiles and splinters when hit by them.

For the ceramic coating applied by means of plasma spraying, several different oxides are suitable, such as aluminum oxide, zirconium oxide, calcium oxide, magnesium oxide, titanium dioxide or silicon dioxide. Also suitable are aluminum silicate, calcium silicate, magnesium silicate, silicon carbide or zirconium carbide. The substances listed here are not the only possibilities, but are to be understood merely as examples.

The substances mentioned can be applied on their own or in mixtures. Tests have demonstrated that it is possible to obtain more effective protection using mixtures than using single substances. For instance, the ceramic coating is preferably manufactured from a mixture of aluminum oxide and titanium oxide. Such a mixture is easy to process with the plasma spray apparatus and provides an attractively priced manufacturing alternative.

Coating a flat structure with ceramic is carried out by means of a plasma spraying technique. The process and the apparatus needed are widely known in the industry.

Plasma spraying is a thermal spraying process. Included under this collective term are voltaic arc spraying, flame spraying, atmospheric plasma spraying and vacuum plasma jet spraying. For the protective clothing of this invention, the other methods of thermal spraying besides atmospheric plasma spraying can be used, particularly vacuum plasma spraying. However, atmospheric plasma spraying, henceforth referred to as "plasma spraying", is the preferable alternative for the invention.

Applying the ceramic coating in the plasma spray apparatus is usually performed with the aid of a carrier gas. In order to improve the bonding between the substrate and the ceramic coating, a substance which acts as a binder is often used.

The coating thickness to be applied depends on the required level of protection and on the desired amount of flexibility. It should be less than 100 $\mu$m. Coating thicknesses of below 60 $\mu$m are preferable, while those of 20–40 $\mu$m are especially preferred.

The ceramic coating can be applied on one or both sides of the flat structure. In the protective clothing of this invention, flat structures with a protective coating applied by plasma spraying on only one side are preferred. For one thing, this is cheaper to manufacture than articles coated on both sides, and for another, no great improvement in the level of stab protection has been observed when both sides of the carrier material have been coated. Surprisingly, it was discovered that coating the flat structures by plasma spraying does not reduce their flexibility. The high level of flexibility is an important factor for protective clothing worn on the body.

The protective clothing of this invention takes the form of protective vests, protective suits, protective gloves, etc. In the manufacture of helmets, too, for instance antiballistic helmets which also contain multiple layers of protective material, flat structures with a ceramic coating applied by plasma spraying can be used. As a further example, protective shoes can also be manufactured using flat structures containing a ceramic coating applied by plasma spraying. The ceramic coating, for instance as a protection against cuts, can be applied to the sole as well as the toe cap area of the shoes.

Even beyond the scope of protective clothing, multi-layered materials, which contain at least one flat-structure layer which has been coated with ceramic using plasma spraying can be utilised, among other things in the field of object protection. For example, plastic containers for storing hazardous chemicals and subject to vandalism can be covered with this type of material. This can prevent the containers being punctured by vandalism, causing these liquids to leak out.

Vehicle protection provides a further type of implementation within the field of object protection, where flat structures containing a ceramic coating applied by plasma spraying can again be used.

The protective clothing which is the subject of this invention can have a protective package that consists entirely of layers which have been given a ceramic coating by means of plasma spraying. But the combined implementation of coated and uncoated protective layers is preferred.

Protective packages are understood to mean superimposed layers of antiballistic or stab-proof flat structures, for example aramide-fibre woven fabrics. The protective clothing of this invention is especially suitable for combined stab and antiballistic protection against bullets and splinters. This kind of protective clothing provides a significantly improved level of protection to police personnel, who in the course of duty are exposed not only to projectile weapons and explosive bodies but also to stabbing attacks. Here protective layers which have been given a ceramic coating using plasma spraying are used in combination with traditional antiballistic woven fabric layers which have not been given such a coating.

Although the ceramic coating applied by means of plasma spraying does not provide any additional bullet or splinter protection, since it does not promote the retardation of bullets or splinters, the traumatic effect caused by a bullet striking the protective clothing is significantly reduced. For protective clothing which is to offer this combined protection through the additional use of protective layers having a plasma-sprayed ceramic coating, it is practical to increase the number of protective layers without detracting from the comfort to the wearer, an effective protection against both kinds of threat is therefore achieved.

For example, a vest of this kind can be formed for combined antiballistic and stab protection in such a way that, out of the 35 protective layers in all, the 25 inner layers next to the body consist of an aramide-fibre woven fabric with a ceramic coating applied by plasma spraying, and the outer ten layers consist of an aramide-fibre woven fabric which has not been so coated.

Protective clothing which only has to provide stab protection can also consist of a combination of protective layers with and without ceramic coating. It is recommended that in this type of protective clothing the layers coated with ceramic material are the outer layers, those layers positioned away from the body. But the opposite arrangement, with the ceramic coated layers next to the body, provides equally good protection against threats by stabbing weapons.

The number of protective-clothing protective layers containing a ceramic coating applied by means of plasma spraying depends on the required level of protection against stab wounds. The use of more than ten layers with ceramic coating is preferred. For use in protective clothing, 20–30 protective layers with a ceramic coating applied by plasma spraying are most preferable.

In the manufacture of a bullet-proof vest, a protective package for combined antiballistic and stab protection which consists of superimposed protective layers with and without ceramic coating is sealed in a jacket of PVC sheeting. The individual layers of the package may be sewn together, but the package can also be placed into the PVC jacket without being bonded together. It has been shown that to achieve better stab protection it is helpful if the individual layers are not immobile. For this reason the layers should be glued only pointwise if at all.

In the manufacture of a bullet-proof vest, the package which is sealed in a PVC jacket is placed in a preprocessed vest, which may consist of dyed or printed woven cotton-polyester fabric. This woven fabric thus forms the outer material of the vest. In the interest of easy removal of the antiballistic package, for instance for cleaning purposes, the package is not entirely stitched into the cover material. Instead, an opening for removal purposes is created using a zip or strip fastener.

A vest for stab protection alone can be manufactured in a similar fashion.

Apart from protection against stab wounds, the protective clothing of the invention also reduces the danger of injury by cutting caused by similar instruments to those which inflict stab wounds.

As the following example 1 will show, with the protective clothing of this invention stab-proof clothing can be manufactured which achieves a good level of protection with greatly reduced weight of the protective package and hence improved wearer comfort. Added to that, very effective stab protection can be obtained for antiballistic protective clothing through the use of protective layers containing a ceramic coating applied using plasma spraying.

Thus the protective clothing of the invention represents significant progress in the manufacture of clothing which provides security personnel a good level of protection in the course of their duties.

EMBODIMENT EXAMPLES

Example 1

This example illustrates the advantages of the stab-protective clothing of the invention.

A woven fabric was manufactured from aramide fibers. The fibers were in the form of a filament yarn with a titer of 930 dtex. The plain-weave fabric had a weight of 198 g/m$^2$.

A ceramic film with a thickness of 40 $\mu$m was applied to this fabric using plasma spraying. The ceramic material consisted of 70% aluminum oxide and 30% titanium dioxide. After being coated, the fabric weighed 292 g/m$^2$.

The stab protection properties were tested against the "Swiss standard", which is equivalent to the standard drawn up by the German police authorities. The "Swiss standard" was published in the November 1993 edition of the Swiss police technical commission's "Technical guidelines for lightweight protective vests". According to these guidelines, a stab test with a stiletto is carried out. As a background, plastilina is positioned behind the protective material. A material is sufficiently stab-proof under this test guideline if the test blade has not penetrated the plastilina by more than 20 mm.

The ceramic coated aramide-fibre woven fabric manufactured as in this example fulfilled the demands posed using a layer structure of 16 layers, which corresponds to a total weight of about 4.8 kg/m$^2$.

A comparative test was carried out with knitted aramide-fibre fabrics, which up to now have often been used for stab-protective clothing. In this test an adequate stab-protection according to the "Swiss standard" was only achieved at or above a weight of 18 kg/m$^2$.

This comparison demonstrates what an advance the material of the invention represents especially as to wearing comfort, since as a consequence much lighter protective clothing can be manufactured from the material of the invention than from the material that has been available up to now.

Example 2

This example demonstrates the advantages of the protective clothing of the invention for combined antiballistic and stab protection.

A woven fabric was manufactured out of aramide fibers. The fibers were in the form of a filament yarn with a titer of 930 dtex. The plain-weave fabric had a weight of 202 g/m$^2$.

After manufacture, this fabric was divided. About 60% was withheld from coating, while the remaining 40% was coated by means of plasma spraying.

A ceramic film with a thickness of 30 $\mu$m was applied. The ceramic material consisted of 60% aluminum oxide and 40% titanium dioxide. After spray coating, the fabric weighed 284 g/m$^2$.

The fabric thus coated was further processed into a protective vest providing combined stab and antiballistic protection. After cut-out a protective package was made in the following way: 35 protective layers were superimposed in such a way that 25 layers of the ceramic coated fabric were next to the body and 10 layers of uncoated fabric were on the outside. The protective package thus manufactured was sealed in a PVC jacket and subjected to a bombardment test. This test was carried out with 9 mm Para (FMJ) ammunition from a distance of 10 m at an angle of 90°. The test of antiballistic effectiveness comprises both detecting whether the structure was penetrated and examining the changes in a plastilina mass positioned behind the material being bombarded. In the latter case, the depth of penetration of the projectile into the plastilina mass provided an approximate measure for the energy imparted by a projectile on the human body under bombardment. Penetration depths into the plastilina mass of up to 44 mm are permitted by police authorities, depending on specification. Examining the depth of penetration in the plastilina mass is an aid to estimating the expected traumatic effect caused by a projectile hitting the protective clothing.

When the vest manufactured in the way described above was bombarded, penetration did not occur until the speed reached 460 m/sec. According to the specifications of the police authorities, a protective vest must withstand a projectile speed of up to 420 m/sec. Below this speed, no penetration is permitted.

The depth of penetration in the plastilina, being 17–18 mm, was well below the permitted values of the police authorities.

In the test of stab-proof properties carried out in accordance with the "Swiss standard", the plastilina penetration depth of 12 mm was significantly below the permitted maximum values.

In comparison to this, a vest manufactured in the conventional manner with 28 layers of fabric manufactured as described above and not ceramic coated was subjected to bombardment. Here, penetration first occurred at a projectile speed of 500 m/sec. The penetration depth in the plastilina was 35–38 mm.

In the stab-protection test according to the "Swiss standard", the plastilina penetration depth significantly exceeded 100 mm. Thus the test material did not meet the stab protection requirements.

Further trials have shown that the values specified by the "Swiss standard" are not fulfilled by protective clothing made of aramide fabric which has not been given a ceramic coating, unless more than 70 layers of the fabric are employed.

The comparison provided by this trial shows that for protective clothing for both antiballistic and stab protection, a larger number of layers of material with a plasma sprayed ceramic coating must be used, in order to guarantee with confidence that the clothing will not be penetrated, but it also shows that protective clothing can be manufactured in this manner to guarantee sufficient protection against both types of threat. In addition, and very importantly, the traumatic effect of a projectile striking the clothing can be significantly reduced.

What is claimed is:

1. Protective clothing comprising multiple layers of flat structures laid on top of one another which if bonded are bonded by being sewn together or glued together pointwise, wherein at least one side of at least one of the layers contains a ceramic coating applied by plasma spraying.

2. Protective clothing in accordance with claim 1, wherein at least one of the layers is a flat structure made of aramides.

3. Protective clothing in accordance with claim 1, wherein at least one of the layers consists of aramides and contains a ceramic coating applied by plasma spraying.

4. Protective clothing in accordance with claim 1, wherein at least one of the layers consists of a woven fabric made from aramide fibers.

5. Protective clothing in accordance with claim 1, wherein at least one of the layers consists of a woven fabric made from aramide fibers and containing a ceramic coating applied by plasma spraying.

6. Protective clothing in accordance with claim 1, wherein the ceramic coating is a combination of at least two different ceramic substances.

7. Protective clothing in accordance with claim 1, wherein the ceramic coating has a thickness of less than 100 µm.

8. Protective clothing in accordance with claim 7, wherein the ceramic coating has a thickness between 20–40 µm.

9. Protective clothing in accordance with claim 1, wherein only one side of the layers contains a ceramic coating applied by plasma spraying.

10. Protective clothing in accordance with claim 1, wherein the protective clothing comprises at least 10 layers containing a ceramic coating applied by plasma spraying.

11. Protective clothing in accordance with claim 10, wherein the protective clothing comprises 20–30 layers containing a ceramic coating applied by plasma spraying.

12. Protective clothing in accordance with claim 1, the protective clothing comprises both layers containing a ceramic coating and layers lacking a ceramic coating.

13. Protective clothing in accordance with claim 1, wherein the protective clothing is stab-protective clothing.

14. Protective clothing in accordance with claim 1, wherein the protective clothing provides protection against stab wounds as well as against projectiles and splinters.

15. A method of protecting an object against stab and projectile wounds, comprising outfitting the object with the protective clothing of claim 1.

16. Protective clothing in accordance with claim 1, wherein the protective clothing further comprises a jacket in which the multiple layers of flat structures are sealed.

17. Protective clothing in accordance with claim 16, wherein the jacket comprises polyvinyl chloride sheeting.

18. Protective clothing in accordance with claim 1, wherein the multiple layers of flat structures are flexible.

* * * * *